US006226291B1

United States Patent
Chauvel et al.

(10) Patent No.: US 6,226,291 B1
(45) Date of Patent: May 1, 2001

(54) TRANSPORT STREAM PACKET PARSER SYSTEM

(75) Inventors: Gerard Chauvel, Antibes; Serge Lasserre, Frejus; Mario Giani, Cagnes sur Mer, all of (FR); Tiemen Spits, North Richland Hills, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/961,764

(22) Filed: Oct. 31, 1997

Related U.S. Application Data
(60) Provisional application No. 60/030,108, filed on Nov. 1, 1996.

(51) Int. Cl.[7] .................................................. H04L 12/28
(52) U.S. Cl. .......................................................... 370/392
(58) Field of Search ..................................... 370/252, 392, 370/410, 412, 413, 415, 417, 426, 470, 471, 472, 474, 522, 528, 401, 402, 403, 404, 405, 486, 487, 493

(56) References Cited

U.S. PATENT DOCUMENTS

| | | | |
|---|---|---|---|
| 5,359,720 | * | 10/1994 | Tamura et al. ........................ 395/400 |
| 5,651,002 | * | 7/1997 | Van Seters et al. .................. 370/392 |
| 5,655,079 | * | 8/1997 | Hirasawa et al. ................ 395/200.01 |
| 5,719,646 | * | 2/1998 | Kikuchi et al. ..................... 348/845.1 |
| 5,812,760 | * | 9/1998 | Mendenhall et al. ............ 395/185.02 |
| 6,122,123 | * | 9/2000 | Saeijs et al. ............................. 360/51 |

\* cited by examiner

*Primary Examiner*—Chau Nguyen
*Assistant Examiner*—Alexander Boakye
(74) *Attorney, Agent, or Firm*—Gerald E. Laws; W. James Brady, III; Frederick J. Telecky, Jr.

(57) ABSTRACT

A transport stream parser system is provided that utilizes an intermediate buffer for containing packets after processing with an associated flag and then use a processor for further processing of packets selected by such flags.

11 Claims, 6 Drawing Sheets

TRANSPORT STREAM PACKET PARSER SYSTEM

This application claims priority under 35 USC §119(e)(1) of Provisional Application No. 60/030,108 (TI-24646P), filed Nov. 1, 1996.

FIELD OF THE INVENTION

The present invention relates to decoders and more particularly, to a transport stream packet parser for use in a decoder.

BACKGROUND OF THE INVENTION

A digital TV decoder can be divided into five modules: demodulation; MPEG transport packet parser (TPP); MPEG audio; MPEG video; and a RISC micro-controller.

A MPEG2 transport stream parser (TPP) receives the MPEG transport stream and selects video, audio or services information packets. After decoding, the packets are stored in memory buffers to form a data stream. The audio decoder processes the MPEG audio stream and produces analog audio signal. The video decoder decompresses the MPEG video and generates a video sequence.

Figure 1:
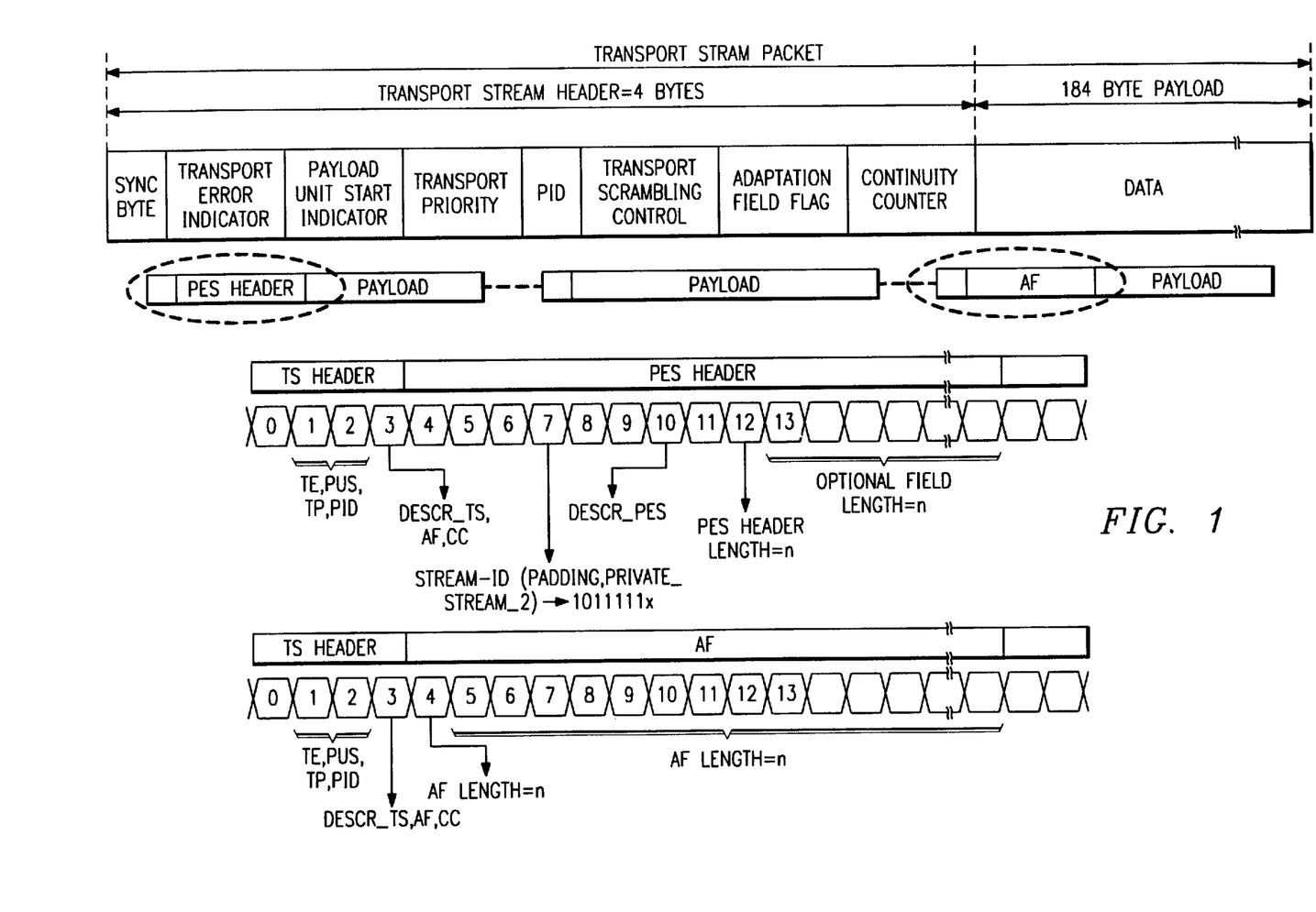
FIG. 1 depicts a transport packet containing 188 bytes.

A transport packet (FIG. 1) contains 188 bytes. The packet is divided in two parts a 32 bits header and 184 bytes of payload. The transport header contains different fields (PID, payload unit start indicator, adaptation field flags, Continuity Counter index) that will allow the transport packet parser to do a coarse filter. After the transport header, the packet can contain an adaptation field of variable length or a payload. Some of these payloads will themselves start with a header (PES header) which has also a variable length (see FIG. 1). The PES header in MPEG2 standard can be bigger than a packet (overflow on the next packet).

Figure 2:
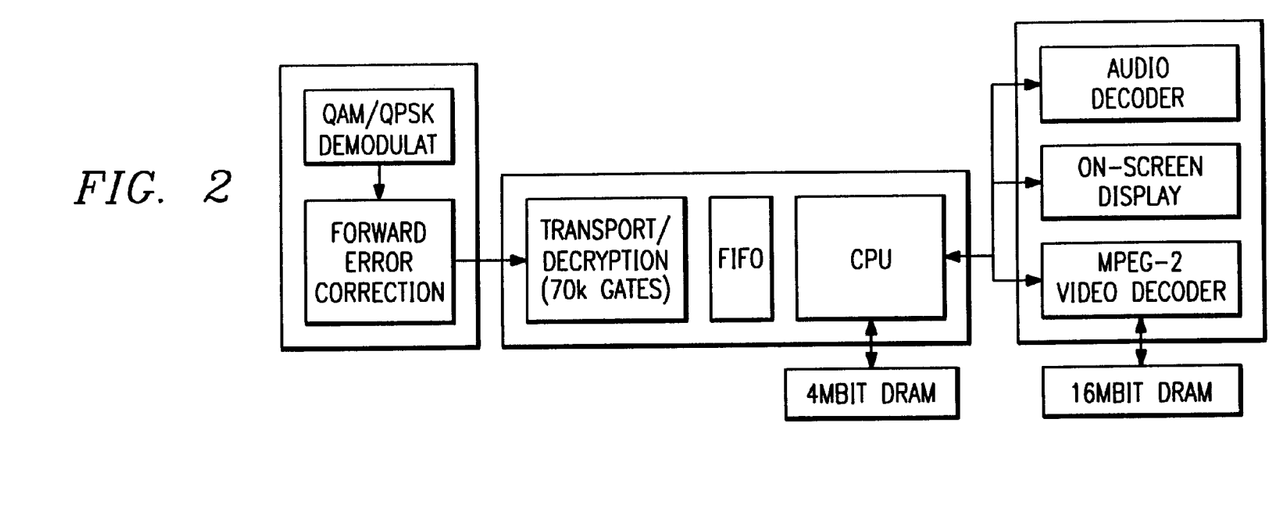
FIG. 2 depicts depicts a prior art decoder system.

The state of the art for MPEG2 transport stream system analyzer consists of chip set solution including a complete transport stream hardware analyzer and a micro-processor. Video and audio decoder are in a separate device as shown in the FIG. 2. The transport stream parser is in charge of the transport stream full analysis (approximately 70 k gates) with the current approach leaving to the CPU the tasks of directing the data towards the right destination and controlling the different modules. Another solution would be to implement all the transport analysis in software. This will require much higher CPU power processing.

SUMMARY OF THE INVENTION

A transport stream parser system is provided that utilizes an intermediate buffer for containing packets after processing with an associated flag and then use a processor for further processing of packets selected by such flags.

DETAILED DESCRIPTION

The transport stream parser of the present invention splits the load of the transport stream and MPEG2 analysis between hardware and software to make the analysis more effective. Hardware filtering allows early decision to be taken based on PIDs recognition and reduces the data stream very efficiently while the firmware executes much more complex filtering algorithms on the reduced data stream. This approach optimizes the resources. The hardware stays simple while the firmware needs less CPU power because the bit rate it receives has been pre-processed by the hardware.

The parsing and routing of the packets are done with a PID recognition mechanism coupled with a set of attributes stored in a local memory for each PIDs. These attributes complete the information received from the different headers.

Transport Packet parser functions

The function of this module is to discard immediately all packets, which are not selected by the application, and to route as many packets as possible without "real time" helps from the embedded software.

Once a packet with a valid PID has been detected, the parser checks the condition set which determines if the packet needs further processings by the CPU (see detailed description of EOP interrupt generation). If one of these conditions is met, the packet is sent to a temporary buffer with an attached flag (further processings is required) and an interrupt EOP is sent to the CPU to indicate that a new packet has been received. Data stored in this temporary buffer are then processed by the embedded software before they can be routed or discarded as shown in path (2) of FIG. 3. Once data have been processed, the RISC transfers them itself or initiates DMA transfers to the system buffer. The software is also going to modify in some cases some of the PID attributes (ex: stream-id filter) to modify the routing of the following packet (same PID). If none of the conditions are met, the attached flag indicates that no additional processing is required. The packet can be automatically forwarded (path (1)) to its final destination via automatic DMA transfers (ex: packets containing compress video information can be sent directly to the system video buffer, . . . ). In this case, no EOP interrupt is sent to the RISC and the packets transfer to the final destination does not require any CPU resource.

Figure 3:
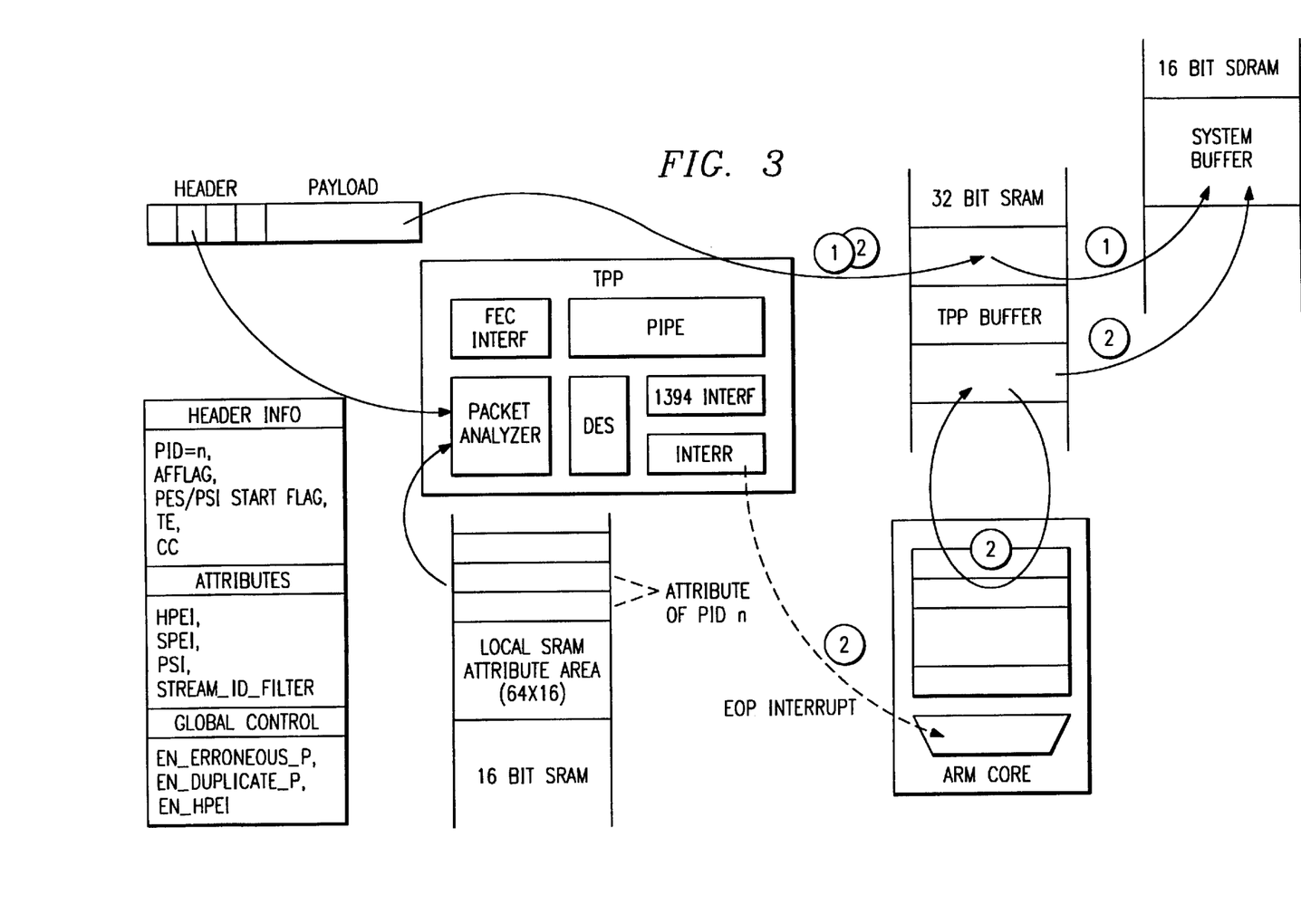
FIG. 3 depicts two data flow paths for incoming data packets.

The FIG. 3 shows the two different data flows:

This mechanism (FIG. 3) is key for the trade-off between hardware/software analysis. The transport stream parser can very easily route the packets and let the CPU do more complex analysis on some part of the bit stream as shown in the chapter Transport Stream software analysis.

Figure 4:
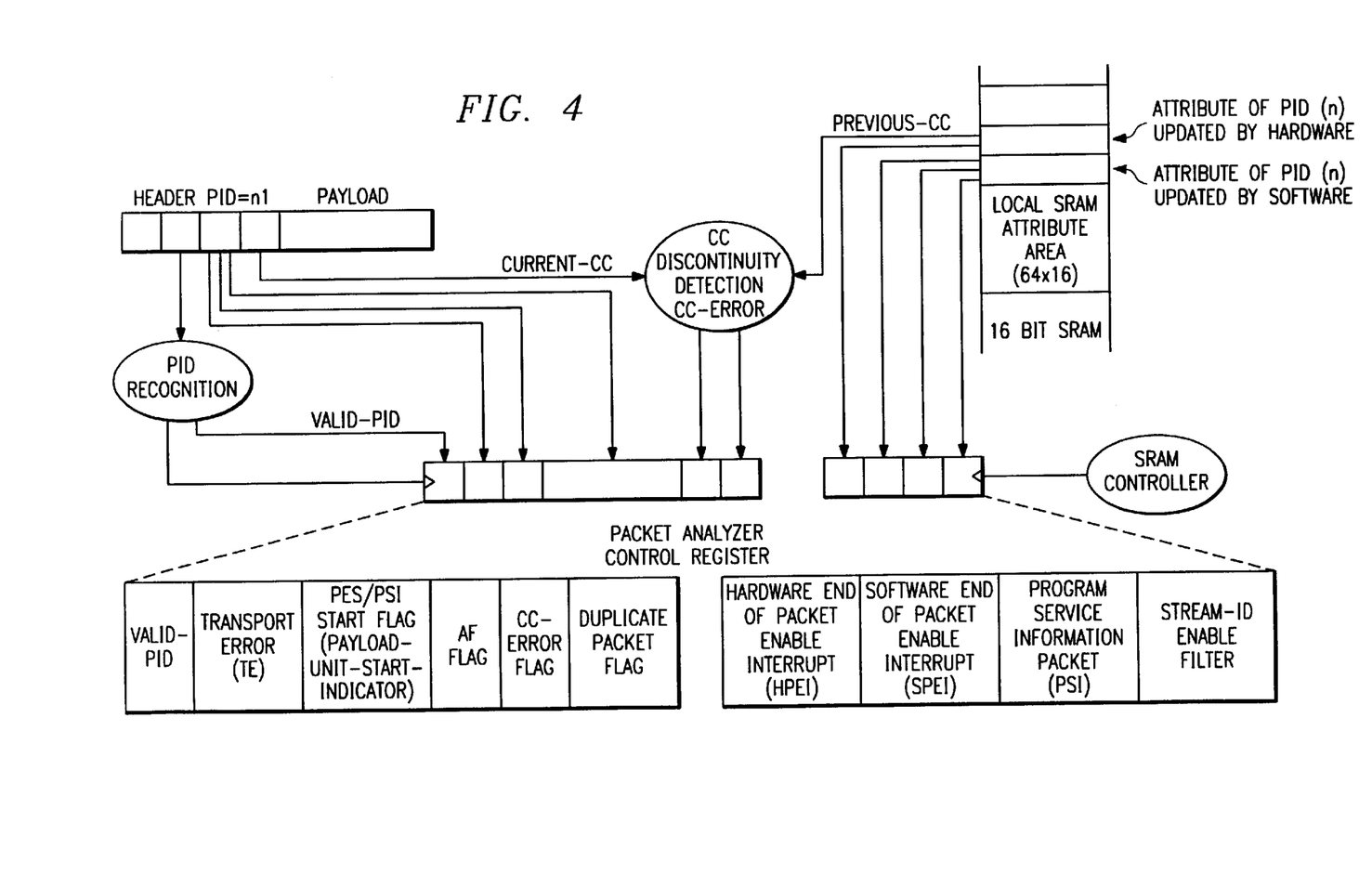
FIG. 4 depicts information and conditions to generate an interrupt.

This choice is done by analyzing the header (PID, AF flag, PES/PSI start flag [payload unit start indicator], transport error flag, counter continuity index), and the PID attributes because the choice can not always be done by extracting information from the packet itself (FIG. 4). Sometimes, the nature of the previous packet (same PID) will determine if the packet needs additional processing (PES header split between two packets). Sometimes, it is linked to the PID number. If a PID contains table information for instance that always require CPU processing then the attribute Spei is set (means that packets with this PID will always be sent to the CPU). The list of information used to generate the EOP interrupt is summarized in the FIG. 4 below.

This figure shows where the information comes from. The conditions to generate the EOP are described later in details.

Packet Analyzer Control Register bit description

Valid PID: This bit is the result of the PID recognition function. The PID number is the packet identification number received in the transport stream header of each packet. It determines if a packet must be transmitted or not to the system. If the PID number has been selected, the Valid_PID bit goes active '1' when a packet with this PID number is received. It is the first level of packet filtering and the necessary condition for the other analysis steps.

Te (transport error indicator): This is retrieved from the Transport Stream packet header. The transport error indicator bit is active when the packet received contains some errors.

Pes/Psi start flag (transport stream payload start-unit-indicator): This is retrieved from the Transport Stream packet header.

When the payload of the Transport stream contains a PES packet data. A '1' indicates that the payload of this Transport stream packet will commence with the first byte of the PES packet (PES header) and a '0' indicates that no PES packet starts in this Transport Stream Packet.

When the payload of the Transport Stream packet contains PSI data. A '1' means that the payload carries at least one beginning of a PSI section and a '0' if no start of a PSI section is carried is this Transport Stream packet.

AF flag (transport stream adaptation field): This two bits field of the Transport Stream header indicates whether the Transport Stream header is followed by an adaptation field or not.

| AF value | description |
| --- | --- |
| 00 | reserved for future use by ISO/IEC |
| 01 | no adaptation field, payload only |
| 10 | adaptation field only, no payload |
| 11 | adaptation field followed by payload |

CC-error: This bit is the result of the hardware discontinuity counter detection function on the continuity counter (CC). The detection is done with a comparison between the CC (4 bit contains in the Transport Stream header) that we call the Current_CC and the CC from the previous packet of the same PID (called Previous_CC). The Previous_CC is an attribute modified by the hardware. Once the comparison is done, the hardware overwrites the Previous_CC with the Current_CC for the reception of the next packet and so on. If the comparison does not match Current_CC= Previous_CC or Current_CC=Previous_CC+1, the CC_error bit goes active.

Duplicate-packet flag: If the comparison indicates that Current_CC=Previous_CC the Duplicate-packet goes active.

Hpei (Hardware End of packet enable interrupt): This is an attribute bit set by Hardware. At reception of a new packet (when packet unit start indicator is active and when it is not a packet with program service information PSI) the Hpei goes active and is reset on the following packet of the same PID. It forces the packet following a packet with a PES header to be temporary stored in a buffer for further analysis in case the PES header would be split between two packets. This bit is necessary when the bit rate of the incoming bit stream is two high to fit within the EOP service routine latency.

Spei (Software End of packet enable interrupt): This attribute bit is set by software and covers two different purposes. First usage, the bit is set at initialization for PID which always requires CPU processing (PID with table information for instance). It is simply used in that case to force all the packets of this PID to be analyzed by the CPU.

The second usage is for audio and video packets whose PES header would be split between two packets. This is only valid for some given system, once the software has determined that its latency response is compatible with the bit stream rate. In that case the software set the Spei as soon as it receives the EOP interrupt of a packet containing a PES header. It determines afterwards if the PES header overflows on the next packet. If it does not it resets the Spei attribute bit. In this case the Spei can replace the Hpei which is disabled to gain in efficiency (see En_Hpei).

PSI (program service information packet flag): In MPEG2 transport stream, one flag in the transport stream header (payload unit start indicator) indicates the start of a new PES packet or the start of a section of a program service information. In order to differentiate these two types of data another attribute is needed (PSI). This attribute is set by the firmware at initialization for PIDs containing program service information (PSI).

It is used to generate Hpei but more importantly for the detection of the boundary between encrypted/clean bytes. Without this information tightly coupled with the PIDs, the controller could not find the encryption flags nor the boundary between encrypted/clean byte on time without some significant input buffers on the bit stream interface.

Stream-id-filter: This software attribute bit is set by software when it receives a packet containing a PES header with a non selected stream-id. Once this attribute is set, the hardware discards all the packet of this PID containing only payload (AF="1x") until it reaches a new PES header. The packet is sent to the CPU which analyzes the PES header and determines if the new stream-id is valid. If it is, it reset the stream-id-filter for the following packets.

Global control bit description

En Hpei: The Hpei mechanism can be switched off/on depending on the constraint of the system. If the software determines that it has enough time to react and modify the Spei attribute bit before the reception of the next packet, It can disable the Hpei attribute. The bit stream parsing is more efficient in that case because the packet following a packet with a PES header is only sent to the CPU for further analysis when the PES header is not fully contained in one packet.

En erroneous p: The global control bit enables transmission of erroneous packets to the temporary buffer. This is mainly to add some flexibility in case some new error concealment could be found in the future.

En duplicate p: The global control bit enables transmission of duplicate packet containing only payload. This is only used for test purposes.

TPP hardware implementation

Figure 5:
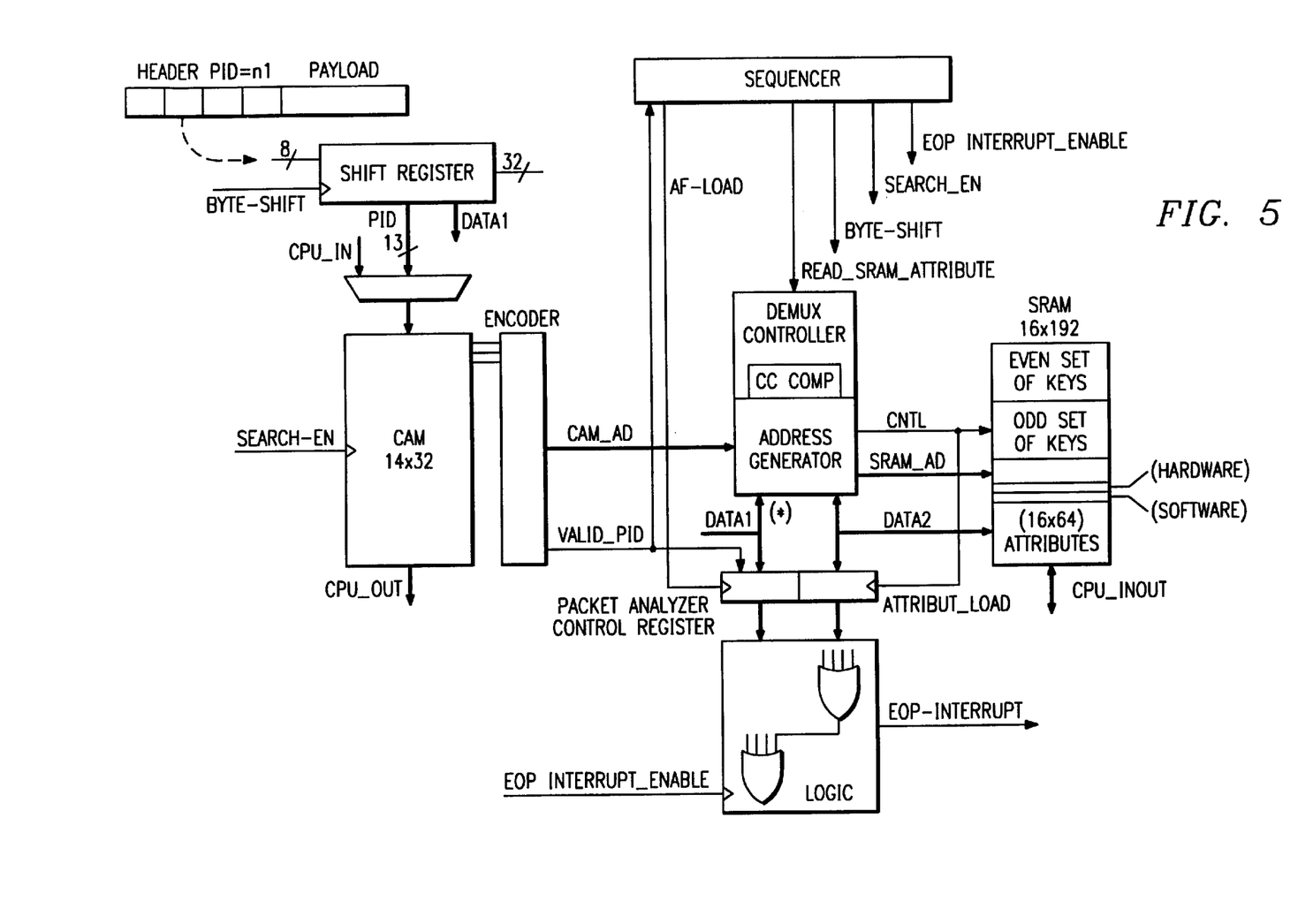
FIG. 5 depicts a block diagram of the system of the present invention.

The following FIG. (5) shows the hardware implementation based on PID recognition. The PID from the Transport packet header is compared in parallel with a set of PIDs (32) located in an associative memory. If the PID in the header corresponds to a PID stored in the associative memory, the CAM encoder outputs a "match" signal (Valid-PID) and a CAM address (cam-ad) in a single system clock period. The valid-PID is used to initiate the transport stream packet analysis and it enables the process to load the others bits coming from the transport stream headers: AF-load (transport-error, payload-unit-start-indicator, adaptation field flag, continuity counter index and other like encryption flags reserved for the control of the decryption module). As soon as a valid PID is detected, the cam-ad is used to look for the associated attributes. The sequencer generates Read-SRAM-attributes to start the state machine controlling the SRAM address generator. The state machine creates the SRAM address from the cam-ad, it reads the SRAM two times, once to retrieve the hardware attribute and a second time to read the software attributes (splitting hardware modified attributes and software modified attributes avoids to use complex protection mechanisms). From both, attributes and bit-stream information (bits from headers), conditions to generate a EOP interrupt are evaluated. The hardware attributes are then updated for the reception of the next packet (same PID). The Software attributes can be updated as parts of the EOP interrupt service routine but only for some very precise function (like stream-id-filter). If the attributes need to be modified before the start of the next packet, then the bit rate, the gap between packets and the interrupt routine service latency must respect some constraints to allow that.

Depending on the,Packet analyzer control bits (FIG. 4), the packet is going to be discarded, automatically transmitted to its final destination or processed before by the embedded software. When one of these conditions to generate an EOP interrupt is met, the bit controlling the interrupt gets active and is reset on the first byte of the following packet. EOP interrupt enable control the position of the interrupt relative to the end of the packet. The different conditions generating the EOP interrupt (FIG. 5: logic block) are described next.

| 1 - Erroneous packet | Normally packets including error are |
|---|---|
| If (Te = 1) | discarded but in some cases it might be |
|   if (En_erroneous_p = 1) | less disrupting for the system to enable |
|     EOP it | a small error than to delete a complete |
|   else | packet. In that case the packet is |
|     "discard packet" | transmitted to the buffer and the |
|   end if | firmware takes the final decision |
| | depending on the packet type (video, audio, etc. . . .). |
| 2 - Discontinuity detection | The EOP packet interrupt will be generated |
| elsif (Current_CC = Previous_CC) | after a discontinuity counter detection. In MPEG2 a CC discontinuity is possible |
|   "duplicate packet" | when the discontinuity flag in the adaptation |
|   if ((AF = "01") and (En_duplicate_p = 0)) | field is set. As shown later all packets with adaptation field generate an EOP interrupt. |
|     "discard packet" | Normally duplicate packets which contain |
|   else | only payload (AF = "01") are discarded. |
|     EOP it | They can be transmitted to let the embedded |
|   end if | software taking the final decision if |
| elsif (Current_CC /= Previous_CC + 1) | the global control bit "En_duplicate_p is set. |
|   EOP it | |
| 3 - List of others conditions | elsif ( Hpei = 1) and (En_Hpei = 1) |
| elsif (AF = "1x") | EOP it |
|   EOP it | |
| elsif (Payload_unit_start_indicator = 1) | |
|   EOP it | |
| An EOP interrupt is generated for: | - all packets following the packets with a payload-unit-start-indicator set. This is |
| - all packets containing an adaptation field, | important because PES header can take more than one packet. |
| - all packets whose payload-unit-start-indicator is set, | This feature can be enable or disable is Spei can be set early enough (see FIG. 6 below). |
|   elsif ( Spei = 1) | - all packets which the embedded |
|     EOP it | software wants to further analyze. |
| elsif (AF = "01" and (((Hpei = 0) and (En_Hpei = 1)) or (Spei = 0)) and (stream-id = 1)) | |
|   "discard packet" | - all packets containing payload only is |
| else "packet automatically transmitted" | discarded if stream-id is active unless attributes to force packets to be analyzed |
| end if | by the embedded software are set (previous cases). |

Note: All these conditions evaluated sequentially in the algorithms are in fact computed in parallel by the hardware.

Once the EOP interrupt conditions are met the embedded RISC processor takes on the analysis task.

Transport Stream software analysis

The microprocessor can perform a more complex analysis than the Transport Packet Parser hardware module and will complete the hardware pre-processing. In addition, the processing can differ according on the type of data that corresponds to the packet: in fact it is very easy to define a software table, based on the PID values, that associates the packet with the particular algorithm to be used.

The software processing of the transport packet is driven by interrupts: once an EOP interrupt is issued, the process that analyzes the packet is started. Two different methods of processing can be selected, according to the CPU latency response and the bit stream rate.

In first case the software sets the Spei flag in the TPP hardware module as soon as it receives the EOP interrupt of a packet containing a PES header. After processing the packet, the software can detect whether the PES header continues in the following transport packet or not: if the PES header ends in the current packet, the CPU resets the Spei bit in the Packet Analyzer Control Register, since it does not need to analyze the following packet; otherwise the Spei bit is left unchanged. This method can be used only if the CPU latency, compared with the input bit rate, allows to set the Spei before the arrival of the following packet.

On the contrary, the second method can be used in any case: if the En_Hpei bit is set in the in the Packet Analyzer Control Register, the CPU does not have to set the Spei bit after each PES header, because the TPP hardware already provide for sending to the ARM processor the packet including the PES header continuation.

Afterwards the reason of the interrupt is found by reading the flags in the registers of the TPP hardware module: if it is the case, the adaptation field is processed.

After the adaptation field analysis the packet can be discarded if there is no payload or the payload is duplicated from the previous packet.

At this point the execution of the software process branches into separate routines, according on the packet type (audio, video, private data, service information, . . . ). Then the data are transferred via a DMA channel to a specific buffer.

This is the algorithm that can be used to analyze the packet (see FIG. 6): the first point in the following list (check of the Pes/Psi start flag and setting of the Spei flag) is optional.

In fact, as mentioned before, if the software latency is short enough to allow to set the Spei bit before the TPP hardware module analyze the following transport packet, this operation will minimize the CPU intervention: an EOP interrupt will be sent to the microprocessor only if the packet following a PES header start has to be processed indeed.

Otherwise, if the bit rate of the incoming stream and the CPU latency are too high, the Hpei mechanism can be enabled (En_Hpei=1): the next packet with the same PID following a PES header starting point will be always transmitted to the CPU.

Check if a PES header starts in the current transport packet by reading the Pes/Psi start flag in the Packet Analyzer Control Register: Packet Status Word (see FIG. 4).

If a PES header starts in the current transport packet, the Spei bit in the Packet Analyzer Control Register has to be set by the CPU in order to intercept the next packet with the same PID: as a matter of fact, the PES header could continue in the following transport packet.

Check the presence of the adaptation field by reading the AF flag in the Packet Analyzer Control Register: Packet Status Word (see FIG. 4).

If the adaptation field is transmitted into the packet, the associated data have to be processed. In particular, the PCR has to be extracted and filtered in order to control the reconstruction of the reference clock. Another important part consists of the analysis of the discontinuity status: if the discontinuity status bit in the adaptation field is set, a discontinuity in the continuity counter value does not correspond to a missing packet. If the discontinuity status is set, the local clock has to be re-initialized to the PCR value, if present.

Check if the packet is duplicated by reading the duplicate packet flag in the Packet Analyzer Control Register (see FIG. 4).

If the packet is duplicated, it is discarded, since no other processing is required. If the Spei bit has been modified at the beginning of the packet because there is a PES header and the Hpei method is not used, the Spei bit has to be cleared before the end of the process.

Check if the packet contains a transport payload by reading the AF flag in the Packet Analyzer Control Register (see FIG. 4).

If there is no payload (adaptation field only) the packet is discarded, since no other processing is required.

Check the packet type

This part of the algorithm is based on a table that associates each selected PID to a particular processing to be performed: in this way, the packet is processed by the related routine. The table contains 32 entries, one for each possible selected PID: each entry allows to identify the packet type (i.e. audio packet, video packet, PES private date, PSI, etc.) and the memory address where the data have to be stored. In particular, if the packet type corresponds to a video stream or to an audio stream (in general to an automatic DMA transfer) and the Hpei mechanism is not used, after the packet processing the Spei bit has to be cleared if the PES header is finished.

Start the DMA transfer

The data after processing are finally transmitted to the specific memory buffer.

Figure 6:
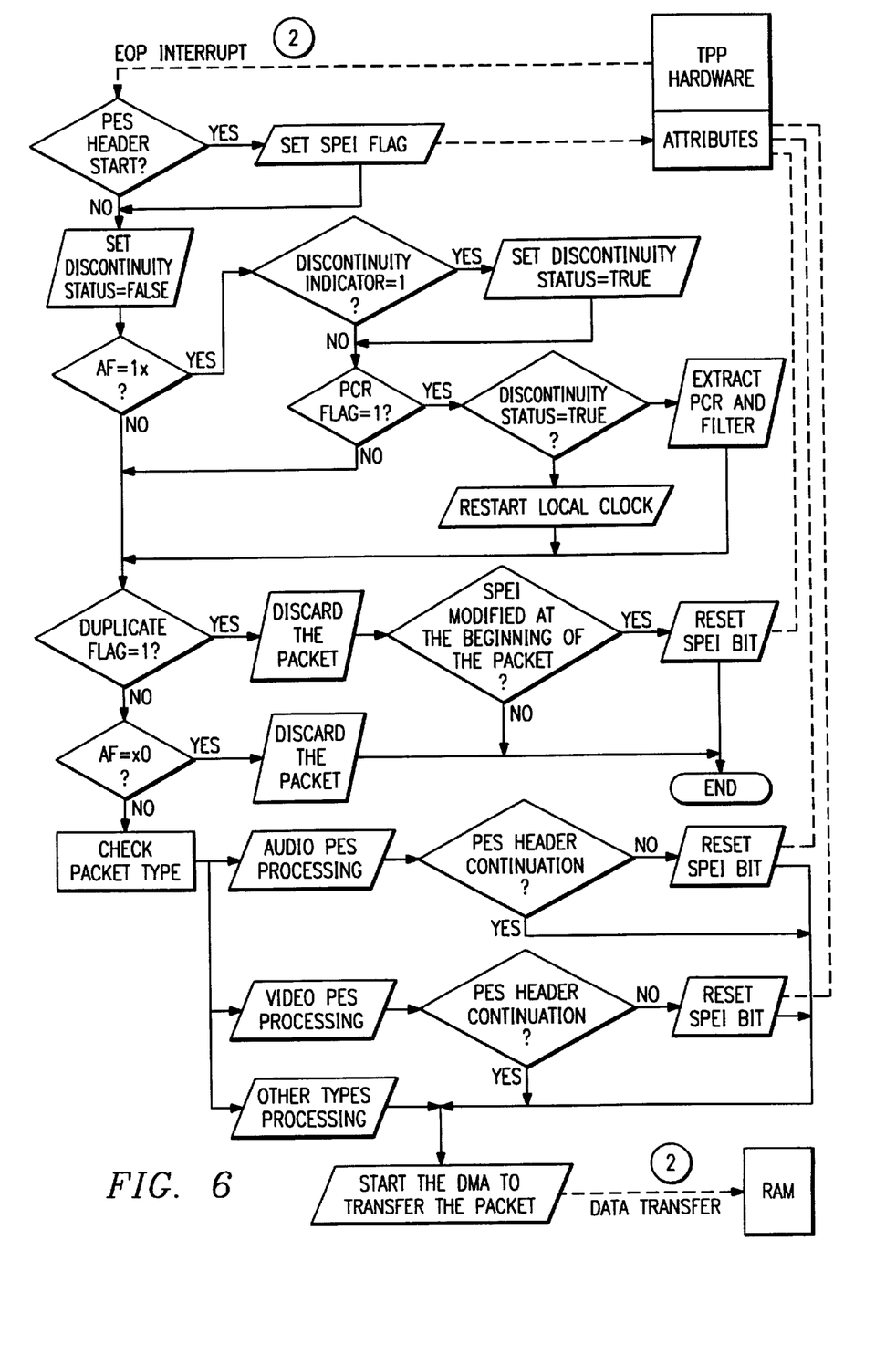
FIG. 6 is a flow diagram used to analyze a packet.

The complete algorithm is shown in FIG. 6: the black modules correspond to the logical blocks of the algorithm that are executed only if the Hpei mechanism is disabled.

Example: transport stream for a video decoder that does not analyze the PES syntax.

Figure 7:
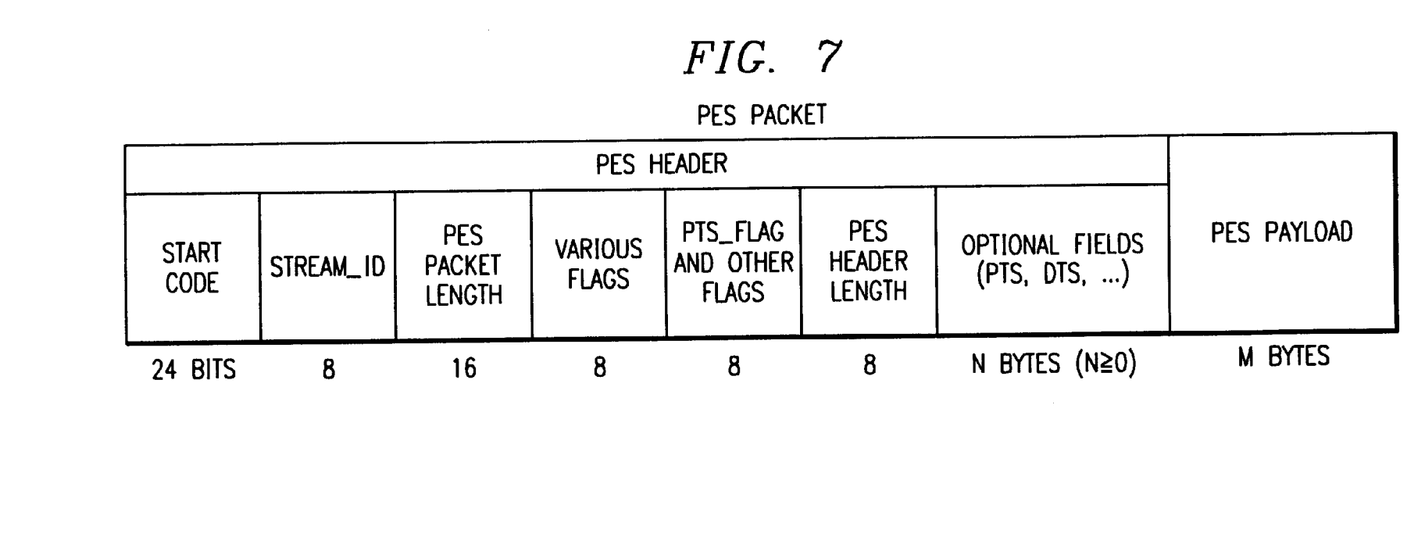
FIG. 7 illustrates the structure of a PES packet.

In this case only the video elementary stream is sent to the video decoder: the PTS value is extracted and written into a register of the video decoder. All the other fields that could be included in the PES header are not considered, as it is allowed by the DVB recommendations. FIG. 7 describes the structure of the PES packet.

The following algorithm is used to process the PES packet. The first part of the PES header is stored in a temporary buffer in order to process the interesting fields: if the header is split among different packets, the process continues after the second packet is received and the first bytes of the header have to be written into the temporary buffer.

This example explains only the part related to the PES analysis. For the other part of the CPU processing, the algorithm described above applies.

Before enabling the PID selection of the TPP hardware module the flags of the TPP control register are initialized as follow:

| | |
|---|---|
| En_erroneous_p = 0 | the packets that contain an error are discarded. |
| En_duplicate_p = 0 | the duplicated packets that don't carry an adaptation fleld are discarded: in this case the payload is identical to the payload of the previous packet. |
| Spei = 0 | automatic transfer without the CPU intervention: the packet is intercepted by the CPU only when the conditions described in the previous sections occur. |
| stream-id filter flag = 0 | no filter on the stream-id field is required. |
| PSI flag = 0 | the video stream is not transmitted by PSI sections, but by using the PES syntax |
| En_Hpei = 1 | the Hpei mechanism is enabled. |

The algorithm can be explained by the following pseudo-code.

PesStatus indicates the status of the PES header processing of the previous status (0=the PES header is finished; 1=the PES header continues from the previous packet and it has not been analyzed yet; 2=the PES header continues from the previous packet and all the useful fields have already been analyzed).

PreviousSize indicates the length of the PES header that has been analyzed in the previous packet and, after the update, the size of the PES packet that has been analyzed in the previous packet plus the size of the PES packet included in the current transport packet.

| | |
|---|---|
| if(CC-error flag = 1) and (discontinuity status = TRUE) | "start error concealment" |
| There is a continuity counter error but the discontinuity is not allowed: some of the previous packets are | missed. In this case an appropriate method of error concealment has to be started. |
| if (PES/PSI start flag = 0) and (PesStatus = 0) "arrange starting point of the data to be transferred" | There is no PES header in this packet: all the payload has to be transferred. |
| elsif (PesStatus = 2) | There is a PES header continuation but all the useful fields have been analyzed in the previous packet. |
| PayloadLength = 184 − AFlength | Calculate the payload length in bytes: the payload size is the transport packet size (184 Bytes) minus the adaptation field length. |
| PreviousSize = PreviousSize + PayloadLength | Update the size. |
| if (PreviousSize < PES packet length) "no operation" else PesStatus = 0 | The PES header does not end in this packet: since the PES payload has not started yet, no data have to be transferred. |
| "arrange starting point of the data to be transferred" | The PES header ends in this packet: the PES payload has to be transferred. |
| else | PesStatus is not equal to 2: the PES header has not been analyzed yet. |
| PayloadLength = 184 − AFlength | Calculate the payload length in bytes: the payload size is the transport packet size (184 Bytes) minus the adaptation field length. |
| "append N bytes to temporary buffer" (N = 14 − PreviousSize) | |
| PreviousSize = PreviousSize + PayloadLength | Update the size. |

-continued

| | |
|---|---|
| if(PreviousSize < 9) | The fixed part of the PES header is not fully included in this packet. |
|     PesStatus = 1; | |
| else | PreviousSize greater or equal to 9: all the flags of the fixed part of the PES header are in this packet. |
|   if(pts_flag = 0) | No PTS is carried by the PES header. |
|     if (PreviousSize < PES header length) | |
|       PesStatus = 2; | No more useful fields but the PES header does not end in this packet. |
|       else | |
|         PesStatus = 0; | |
|         "arrange starting point of the data to be transferred" | |
| else | The PES header ends in this packet: the PES payload has to be transferred. |
| else | The PES header contains a PTS |
|   if(PreviousSize < 14) | The PTS is in the following packet |
|     PesStatus = 1; | |
|   else | The PTS is in this packet. |
|     "write PTS to video decoder" | |
|     if (PreviousSize < PES header length) | |
| | The header does not end in this packet. |
|       PesStatus = 2; | |
|     else | The header is finished. |
|       PesStatus = 0; | |
|       "arrange starting point of the data to be transferred" | |
| | The PES header ends in this packet: the PES payload has to be transferred. |

In this case the packet is sent to the CPU only when the PES header is present: the occurrence can be easily found by checking the value of the PUS indicator in the transport packet header.

Let us suppose that the video stream is coded in frames with a bit rate of 15 Mbps: if the CPU has to process each packet, it will be interrupted about each 100 μsec.

On the contrary, by using the preliminary filter and routing performed by the TPP hardware, the CPU is interrupted each PES packet: if the PES packet length is equivalent at least to the frame size, the interrupts are generated, in the worst case, each 40 ms.

Example: transport stream for an audio decoder that analyzes the PES syntax, a filter on the stream-id field is performed In this example the audio decoder can analyze the PES packet but the CPU has to filter all the PES packet with a stream-id different from a specific value: if the stream-id is identical.

The general algorithm showed in FIG. 6 and described in the previous pages is used: the following part describes only the specific part of the processing related to the audio PES packet. In particular, the Hpei mechanism is disabled, so the CPU sets the Spei flag every time a transport packet containing the starting point of a PES header is received.

Before enabling the PID selection of the TPP hardware module the flags of the TPP control register are initialized as follow:

| | |
|---|---|
| En_erroneous_p = 0 | the packets that contain an error are discarded. |
| En_duplicate_p = 0 | the duplicated packets that don't carry an adaptation field are discarded: in this case the payload is identical to the payload of the previous packet. |
| Spei = 0 | automatic transfer without the CPU intervention: the packet is intercepted by the CPU only when the conditions described in the previous sections occur. |
| stream-id filter flag = 1 | a filter on the stream-id field is required. |
| PSI flag = 0 | the audio stream is not transmitted by PSI sections, but by using the PES syntax. |
| En_Hpei = 0 | the Hpei mechanism is disabled, the CP has to set and reset the Spei bit. |

After the initialization, the TPP hardware module discards all the packets until the first PES header is received. At this point an EOP interrupt is issued and the CPU analyze the packet.

If the stream-id value matches a specific pattern, all the PES packet has to be sent to the audio decoder: as consequence the microprocessor clear the stream-id filter flag in the Packet Analyzer Control Register and all the transport packets are automatically transmitted to the audio decoder. When another PES header is found by the TPP hardware (the packet unit start indicator in the transport header is set), an interrupt is generated and the CPU can perform another filter operation on the stream-id value of the new PES packet.

If the stream-id value does not match the specified pattern, the CPU set the stream-id flag in the TPP module and all the following transport packets with the same PID are automatically discarded by the hardware until the next PES header.

The algorithm can be explained by the following pseudo-code. The CPU does not analyze all the PES header, but only the stream-id field.

PesStatus indicates the status of the PES header processing of the previous status (0=the PES header is finished or the PES header continues from the previous packet but the stream-id value has been already filtered; 1=the PES header continues from the previous packet and the stream-id value has not been filtered yet).

PreviousSize indicates the length of the PES header that has been read in the previous packet.

| | |
|---|---|
| if (stream-id filter flag = 0) and (PES/PSI start flag = 0) | The current packet does not match the stream-id filter pattern and there is no PES header: the packet has to be discarded. |
|   "discard the packet" | |
| else | |
|   if (CC-error flag = 1) and (discontinuity status = TRUE) | There is a continuity counter error but the discontinuity is not allowed: some of the previous packets are missed. |
|     "start error concealment" | In this case an appropriate method of error concealment has to be started. |
| | "arrange starting point of the data to be transferred" |
|   if (PESIPSI start flag = 0) and (PesStatus = 0) | There is no PES header in this packet: all the payload has to be transferred. |
|   else | There is a PES header or a PES header continuation. |
|   PayloadLength=184−AFlength | Calculate the payload length in bytes: the payload size is the transport packet size (184 Bytes) minus the adaptation field length. |
|   PreviousSize = PreviousSize + PayloadLength | Update the size. |
|   if (PreviousSize < 4) | The stream-id is not included in this |

-continued

| | packet. The next transport packet has to be analyzed. |
|---|---|
| PesStatus = 1; else | PreviousSize greater or equal to 4: the stream-id field is included in this packet. |
| PesStatus = 0; | The CPU does not have to analyze the next packet |
| if(stream-id = "pattern") | Filter the stream-id field: if the value is equal to a specific pattern, the PES packet is selected |
| "clear stream-id filter flag" | Disable the automatic discarding of the packets by the TPP hardware |
| "arrange starting point of the data to be transferred" | |
| | The PES header ends in this packet: the PES payload has to be transferred. |
| else | The stream-id field is different from the specified pattern: the PES packet has to be discarded. |
| "set stream-id filter flag" | Enable the automatic discarding of the packets by the TPP hardware |
| "discard the packet" | |

At this point the Spei bit is cleared only if PesStatus is equal to zero, since the considered part of the PES header has been already processed.

In this case an interrupt is sent to the CPU only when the PES header is present in order to filter the stream-id value. If the stream-id matches the selected value, the following packets are automatically transmitted to the destination buffer; on the contrary, if the stream-id does not match the selected value all the following packets are discarded by the TPP hardware module until the next PES header.

Without this mechanism, the CPU should be forced to receive an interrupt to discard all the transport packets that are included in a PES packet with an unwanted value of stream-id.

What is claimed:

1. Packet identification and processing circuitry, comprising:

a shift register for extracting a portion of data from a packet's header;

an associative memory coupled to shift register for storing reference data for packet types and for determining if said portion of data from said shift register matches any one of said reference data, said associative memory responsive to a determination of matched reference data for outputting information indicative of said matched reference data;

an address generator coupled to said associative memory and responsive to said information for generating an address corresponding to said matched reference data;

a memory coupled to said address generator for storing attribute data for each of said reference data; and logic circuitry coupled to said memory and said shift register, and responsive to selected attribute data associated with said matched reference data and further data provided by said shift register for determining how to process said packet.

2. The circuitry of claim 1, including a data path from said shift register to said logic circuitry and responsive to said information for providing said further data to said logic circuitry.

3. The circuitry of claim 2, wherein said data path includes a further register having a data input coupled to shift register and having a load input coupled to said associative memory for loading said further data in response to said information, said further register having a data output coupled to said logic circuitry.

4. The circuitry of claim 3, wherein said further register has a further data input coupled to said memory for receiving the selected attribute data.

5. The circuitry of claim 3, including a sequencer coupled to said associative memory and said load input of said further register and responsive to said information for driving said load input.

6. The circuitry of claim 5, including an encoder coupled between said associative memory and said sequencer for encoding said information and providing corresponding encoded information to said sequencer.

7. The circuitry of claim 1, including a sequencer coupled to said associative memory and said address generator, said sequencer responsive to said information for providing a control signal to said address generator.

8. The circuitry of claim 7, including an encoder coupled between said associative memory and said sequencer for encoding said information and providing corresponding encoded information to said sequencer.

9. The circuitry of claim 1, wherein said address generator includes a state machine for accessing from said memory both hardware attribute data and software attribute data associated with said matched referenced data.

10. The circuitry of claim 9, including a sequencer coupled to said associative memory and said address generator, said sequencer responsive to said information for providing a control signal to said state machine.

11. The circuitry of claim 1, including an encoder coupled between said associative memory and said address generator for encoding said information and providing corresponding encoded information to said address generator.

* * * * *